(12) United States Patent
Entezari et al.

(10) Patent No.: US 7,464,301 B1
(45) Date of Patent: Dec. 9, 2008

(54) METHOD AND APPARATUS FOR CAPTURING AND LOGGING ACTIVITIES OF A STATE MACHINE PRIOR TO ERROR

(75) Inventors: Mehdi Entezari, Collegeville, PA (US); Justin A. Refice, Norristown, PA (US)

(73) Assignee: Unisys Corporation, Blue Bell, PA (US)

( * ) Notice: Subject to any disclaimer, the term of this patent is extended or adjusted under 35 U.S.C. 154(b) by 544 days.

(21) Appl. No.: 11/197,145

(22) Filed: Aug. 4, 2005

(51) Int. Cl.
   *G06F 11/00* (2006.01)
(52) U.S. Cl. ......................................................... 714/45
(58) Field of Classification Search .................... 714/45
   See application file for complete search history.

(56) References Cited

U.S. PATENT DOCUMENTS

| | | | | |
|---|---|---|---|---|
| 5,680,583 | A * | 10/1997 | Kuijsten ........................ | 703/23 |
| 6,134,676 | A * | 10/2000 | VanHuben et al. ............. | 714/39 |
| 6,609,164 | B1 * | 8/2003 | Kallat ........................... | 710/22 |
| 6,732,307 | B1 * | 5/2004 | Edwards ....................... | 714/724 |
| 6,912,613 | B2 * | 6/2005 | Lee et al. ...................... | 710/316 |
| 7,017,084 | B2 * | 3/2006 | Ng et al. ........................ | 714/45 |

* cited by examiner

*Primary Examiner*—Emerson C Puente
(74) *Attorney, Agent, or Firm*—Richard J. Gregson; Robert P. Marley; Volpe and Koenig P.C.

(57) ABSTRACT

A method and apparatus for capturing and logging activities of a state machine prior to error. The state machine receives a packet and processes the packet. A state machine monitor is provided for each state machine. The state machine monitor logs activities of its associated state machine in a trace buffer when the state machine changes its state. The changes of the states in the state machine are traced to create a record in the trace buffer. Optionally, a snooper may be provided to determine whether a predetermined condition exists in the received packet. The snooper attaches a trigger tag to the received packet when the predetermined condition exists. The state machine monitor stops tracing the changes of the states of the state machine when the state machine monitor detects the trigger tag in a packet forwarded to its associated state machine.

7 Claims, 5 Drawing Sheets

METHOD AND APPARATUS FOR CAPTURING AND LOGGING ACTIVITIES OF A STATE MACHINE PRIOR TO ERROR

FIELD OF INVENTION

The present invention is related to a state machine. More particularly, the present invention is related to a method and apparatus for capturing and logging activities of a state machine.

BACKGROUND

In general, a state machine may be any device that stores a particular status at a particular time. A state machine may change state (i.e., change status) based on an input and/or cause an action or output to take place based on a change in state. States are typically connected by "transitions" wherein each transition is labeled with the name of an input event. When that event occurs, the corresponding transition is followed from the current state to arrive at the new state.

FIG. 1 is a diagram showing transitions between states of a simple state machine. In this example, the state machine can be in one of five states: states s(0), s(1), s(2), s(3), and s(4). Each state causes its own set of outputs to be asserted. The outputs could be any number of signals. The state machine stays in a state until an appropriate input event condition is satisfied. For instance, if the state machine is in state s(0), it stays in that state with output signal(s) o(0) asserted until input event i(1a) occurs, which causes the state machine to make a transition to the state s(1), or input event i(1b) occurs, which causes a transition to state s(2).

A state machine is useful whenever it is necessary to implement a program having input events with multiple states depending on those events. These situations arise frequently in communications, parsing, emulations, and handling user inputs to name a few. A computer may be considered a state machine wherein each instruction or request that is input to the computer may change one or more states, thereby causing other actions to take place.

State machines often do not work properly for a variety of reasons. The state machine may fall into two conflicting valid states which are caused by mistakes or oversights of the system designer. In such a case, the state machine may malfunction or may cause other state machines to malfunction. Since the problem can cascade from one state machine to other state machines, it is difficult to determine which state machine caused the problem without a proper tracking mechanism. Therefore, it would be desirable to provide a function for tracing the states of state machines.

SUMMARY

The present invention is related to a method and apparatus for capturing and logging activities of a state machine prior to error. The state machine receives a packet and processes the packet. A state machine monitor is provided for each state machine. The state machine monitor logs a state of its associated state machine in a trace buffer when the state machine changes its state. Therefore, changes in state of state machines are traced with a record being stored in a trace buffer. Optionally, a snooper may be provided to determine whether a predetermined condition exists in a received packet. The snooper attaches a trigger tag to the received packet when the predetermined condition exists. The state machine monitor stops tracing the changes of the states of the state machine when the state machine monitor detects the trigger tag in a packet forwarded to the associated state machine.

DETAILED DESCRIPTION OF THE PREFERRED EMBODIMENTS

Figure 1:
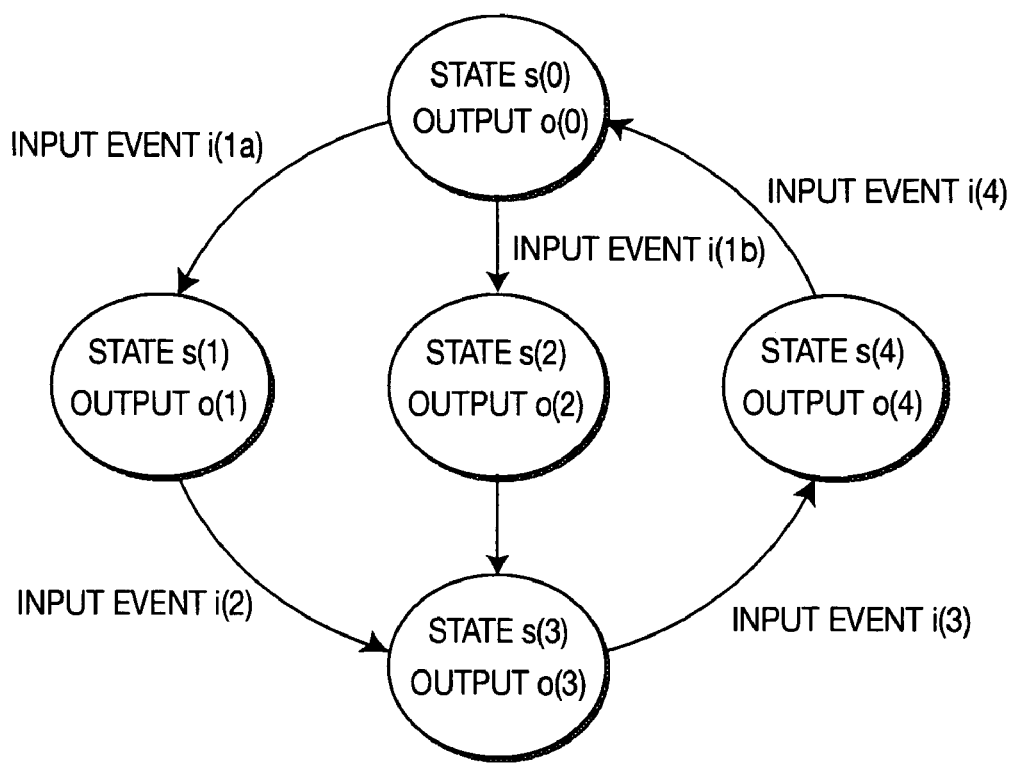
FIG. 1 is a diagram of states of a conventional state machine.

The present invention will be described with reference to the drawing figures wherein like numerals represent like elements throughout.

Figure 2:
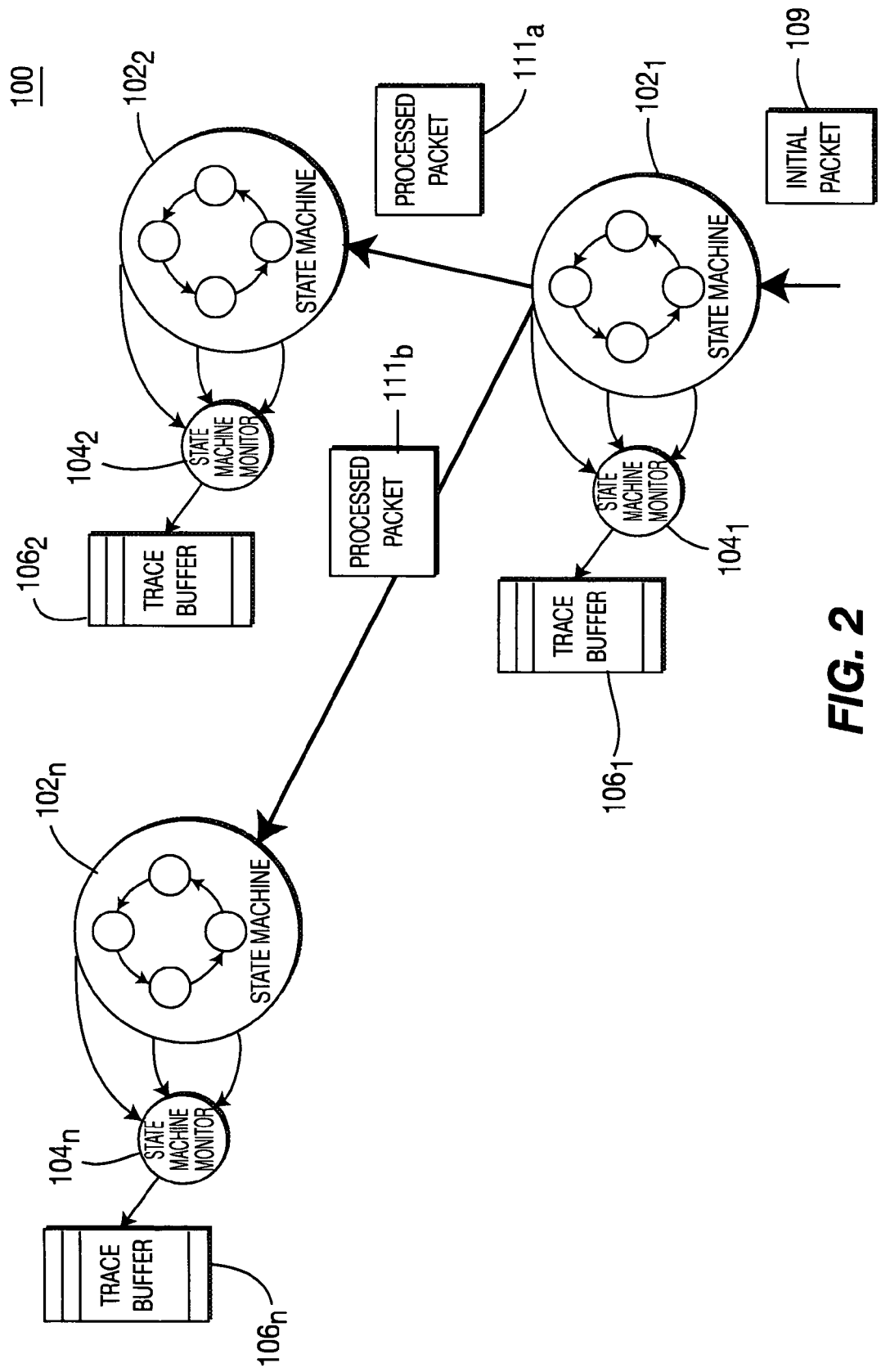
FIG. 2 is a diagram of a system with a plurality of state machines wherein a state machine monitor is provided for each state machine.

FIG. 2 is a diagram of a system 100 with a plurality of state machines $102_1$-$102_n$ and a plurality of state machine monitors $104_1$-$104_n$. There is preferably a one-to-one correlation between state machines $102_1$-$102_n$ and state machine monitors $104_1$-$104_n$. (i.e. for each state machine, there is a state machine monitor) although other arrangements may be utilized as desired. The state machines $102_1$-$102_n$ are preferably connected to their respective state machine monitors $104_1$-$104_n$ so that activities in each state machine $102_1$-$102_n$ are traced. An external trace buffer $106_1$-$106_n$ is provided for each state machine monitor $104_1$-$104_n$ wherein the activities of each state machine $102_1$-$102_n$ are recorded.

By way of example, a first state machine $102_1$ receives an initial packet (or an instruction) 109 and performs proper activities in a corresponding state. The changed state is detected by the connected state machine monitor $104_1$ and is recorded in the trace buffer $106_1$. The first state machine $102_1$ generates a processed packet $111_a$ and a processed packet $111_b$ and sends them to other state machines $102_2$-$102_n$. Similarly, appropriate operations take place at other state machines $102_2$-$102_n$, and changes in state of the state machines $102_2$-$102_n$ are detected by the corresponding state machine monitors $104_2$-$104_n$ and recorded in the trace buffers $106_2$-$106_n$.

Figure 3:
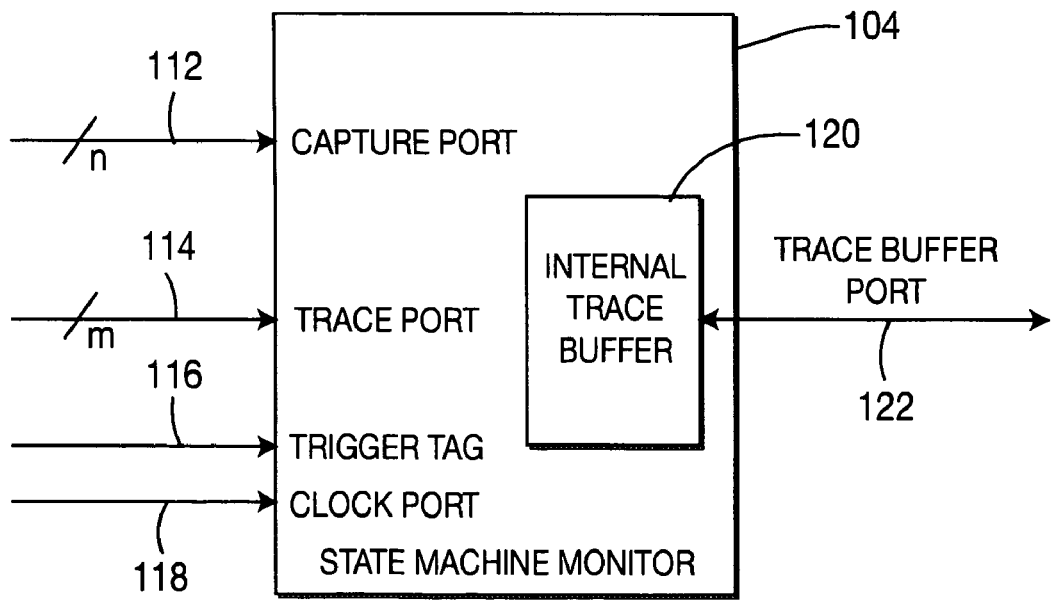
FIG. 3 is a block diagram of a state machine monitor shown in FIG. 2.

FIG. 3 is a block diagram of a state machine monitor 104. The state machine monitor's 104 function is to trace and log the state of a corresponding state machine 102. The state machine monitor 104 includes a capture port 112, a trace port 114, an optional trigger tag port 116, a clock port 118, an internal trace buffer 120, and a trace buffer port 122. The state machine monitor 104 traces the signals on the trace port 114 whenever it detects a change in any of the signals connected to the capture port 112. The tracing preferably happens on the rising or falling edge of a clock signal.

The state of the capture port 112 signals are preferably sampled at each rising edge of the clock signal and compared against the state of the signals in the previous clock signal. If the current signal on the capture port 112 is different from the previous one, then the states of the trace port signals are logged in the internal trace buffer 120.

Any change in the capture port 112 signals causes the capture of the state of the trace port 114 signals in the state machine monitor's internal trace buffer 120. The trace port 114 signals can be any signal that is important to the user of the state machine monitor 104. For example, the trace port 114 signals can be information about the packet that the state machine 102 is processing.

The internal trace buffer 120 logs the captured information from the trace port 114. Each entry in the internal trace buffer 120 corresponds to the state of the trace port 114 signals when a change occurred on any of the capture port 112 signals. The internal trace buffer 120 may be circular. Therefore, a pointer for the internal trace buffer 120 rolls over to the beginning of the buffer when the buffer becomes full. A trace buffer port 122 is used to retrieve a trace log from the internal trace buffer 120. The contents of the internal trace buffer 120 are output to an external trace buffer 106 (not shown in FIG. 3) via the trace buffer port 122.

The optional trigger tag port 116 stops the state machine monitor's tracing function. The state machine monitor 104 stops tracing when the trigger tag signal is asserted on the trigger tag port 116, which will be explained in detail hereinafter.

Figure 4:
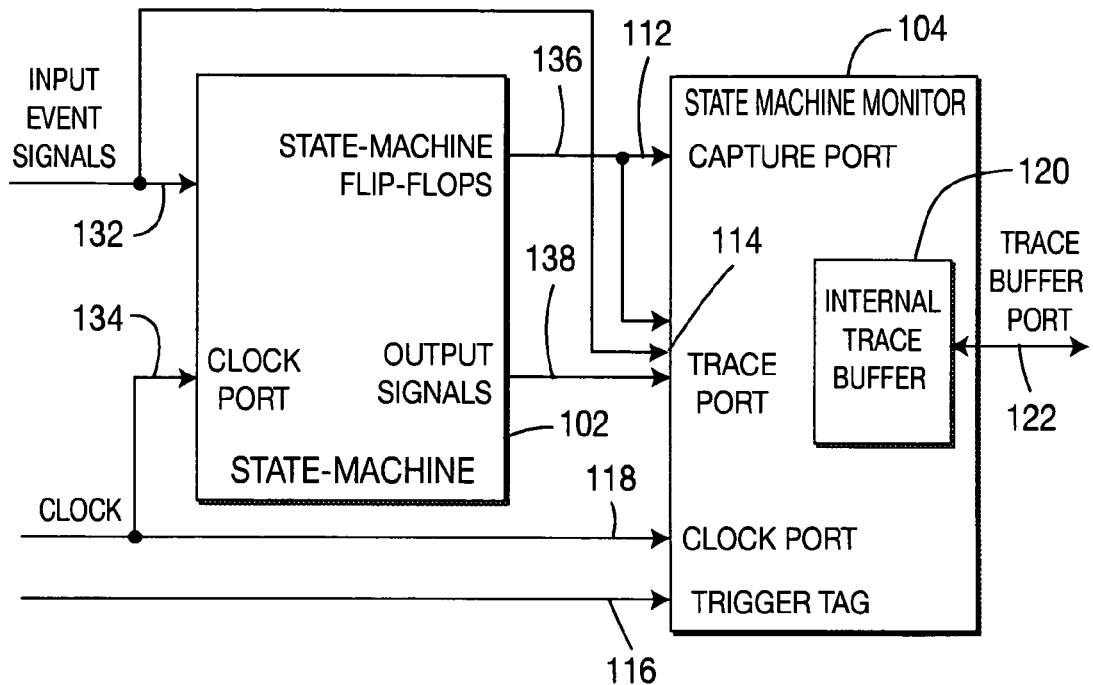
FIG. 4 is a block diagram of inputs and outputs of a state machine and a state machine monitor.

FIG. 4 is a block diagram of a state machine 102 and a state machine monitor 104 wherein an interaction between the state machine 102 and the state machine monitor 104 is shown. The state machine 102 includes an input port 132, a clock port 134, a state machine state output port 136, and an output port 138. A received packet or instruction (i.e. input event signals) enters the input port 132. The state machine 102 processes the received packet or performs proper activities in accordance with the instruction(s), and outputs processed packets via the output port 138. The state of the state machine 102 is preferably represented by state machine flip-flops (not shown) in the state machine 102 and is signaled through the state machine state output port 136.

As mentioned above, input event signals enter the input port 132 of the state machine 102. The input event signals may also enter the trace port 114 of the state machine monitor 104. The signal indicating the state of the state machine 102 enters the capture port 112 of the state machine monitor 104, and may also enter the trace port 114 of the state machine monitor 104. Further, the output port 138 of the state machine 102 may also be connected to the trace port 114 of the state machine monitor 104.

Any state changes in state machine 102 causes the input signals to the trace port 114 of the state machine monitor 104 (i.e., input event signals, output signals, and the state signals) to get captured in the internal trace buffer 120 of the state machine monitor 104. The input event signals may include packets that the state machine 102 processes, along with a sequence ID assigned to each packet by a snooper 108 (as will be explained later). Therefore, the state machine monitor 104 traces and logs any state transition by the state machine 102. The state machine monitor 104 discontinues tracing the states of the state machine 102 when the state machine monitor 104 detects a trigger tag bit set on the trigger tag port 116.

Table 1 is an example of the contents of the internal trace buffer in the exemplary state machine of FIG. 1. In this example, the internal trace buffer stores the state transition history of the state machine 102 along with packet information, sequence IDs, trigger tag bit information, and output signals. This log information is useful for debugging purposes.

TABLE 1

| | Trace Port | | | | |
|---|---|---|---|---|---|
| Entry | State Machine FFs | Packet Info | Sequence ID | Trigger Tag bit | Output signals |
| 0 | S(0) | xxxxxxxx | N − 1 | 0 | xxxxxxxx |
| 1 | S(1) | xxxxxxxx | N | 0 | xxxxxxxx |
| 2 | S(3) | xxxxxxxx | N | 0 | xxxxxxxx |
| 3 | S(4) | xxxxxxxx | N | 0 | xxxxxxxx |
| 4 | S(0) | xxxxxxxx | N | 0 | xxxxxxxx |
| 5 | S(2) | xxxxxxxx | N + 1 | 1 | xxxxxxxx |
| 6 | S(3) | xxxxxxxx | N + 1 | 1 | xxxxxxxx |
| 7 | S(4) | xxxxxxxx | N + 1 | 1 | xxxxxxxx |
| 8 | S(0) | xxxxxxxx | N + 1 | 1 | xxxxxxxx |
| 9 | | | | | |
| 10 | | | | | |

Figure 5:
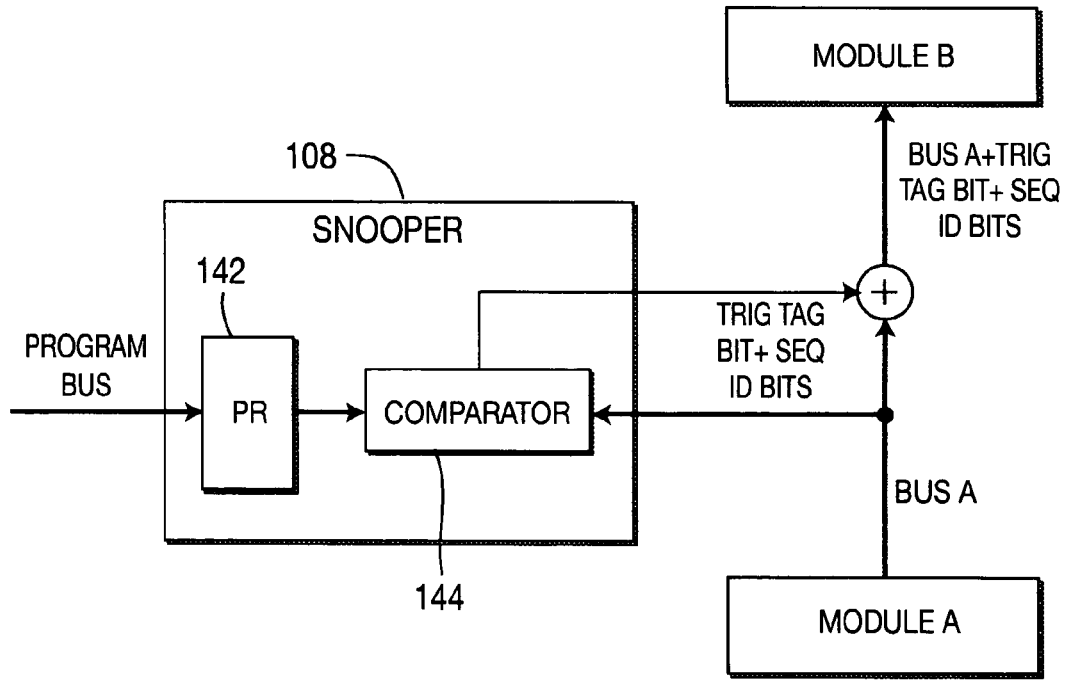
FIG. 5 is a block diagram showing operation of a snooper with other modules.

FIG. 5 is a block diagram showing operation of a snooper 108 with other modules. The snooper 108 includes a programmable register (PR) 142 and a comparator 144. The snooper 108 is responsible for monitoring the incoming packets and tagging a trigger tag bit to the packets when a predefined condition is met. The predefined condition is programmable.

In FIG. 5, Module A sends its packets to Module B through a Bus A. The Module A or Module B can be a collection of logic or a system bus such as PCI, PCIx, PCIe, or front side bus (FSB) of a processor. The PR 142 within the snooper 108 is programmed via a program bus by the system to monitor Bus A so that the snooper 108 snoops for an occurrence of a predefined condition. The comparator 144 compares the programmed condition in the PR 142 against the information on Bus A. When a match occurs, the comparator 144 attaches a trigger tag bit to the packet. For example, the comparator 144 compares a destination address of the received packet and if the address is the same as a particular address, the comparator 144 attaches a trigger tag bit to the packet.

The packet carries the trigger tag bit when it traverses through Module B and subsequent modules. State machine monitors $104_1$-$104_n$ (not shown in FIG. 5) attached to state machines $102_2$-$102_n$ (not shown in FIG. 5) of the modules that process the packets with the trigger tag bit discontinue tracing the states of the state machines $102_2$-$102_n$ when the state machine monitors $104_1$-$104_n$ detect that the trigger tag bit is set. The state machine monitors $104_1$-$104_n$ do not stop tracing states of the state machines $102_2$-$102_n$ at the same time. Each state machine monitor $104_1$-$104_n$ stops tracing at a different time as the tagged packet is processed through the state machines $102_2$-$102_n$. It may take a relatively long time for a particular state machine to see and process the packet before sending a processed packet to other state machines, since the particular state machine might have many packets buffered to be processed before the tagged packet. Therefore, in accordance with the present invention, the process for turning the state machine monitors $104_1$-$104_n$ off preferably proceeds slowly as the tagged packet is processed through the state machines $102_2$-$102_n$ so that the trace buffers 106 of the state machine monitors $104_1$-$104_n$ can contain the records of the state machines $102_2$-$102_n$ up to the tagged packet (or optionally a little further). The rate at which the state machine monitors $104_1$-$104_n$ are turned off may be configured as desired.

The snooper 108 may also tag every packet with a sequence ID. The sequence IDs may be used in a state machine monitor's 104 internal trace buffer 120 to differentiate between packets.

Alternatively, it is noted that Module A in FIG. 5 could be a bus. In which case the snooper is used as a bus monitor in the system, which can be implemented in an operational system.

It is noted that the present invention is useful for debugging. Since a state machine 102 can fall into two conflicting valid states, which are caused by mistakes or oversights of the system designer, and the problem is often cascaded to other state machines 102, it is difficult to determine which state machine 102 causes the problem without a proper tracking mechanism. Since each state machine monitor 104 contains a record up to the tagged packet (or optionally a little further), the present invention reduces the amount of debugging substantially.

Figure 6:
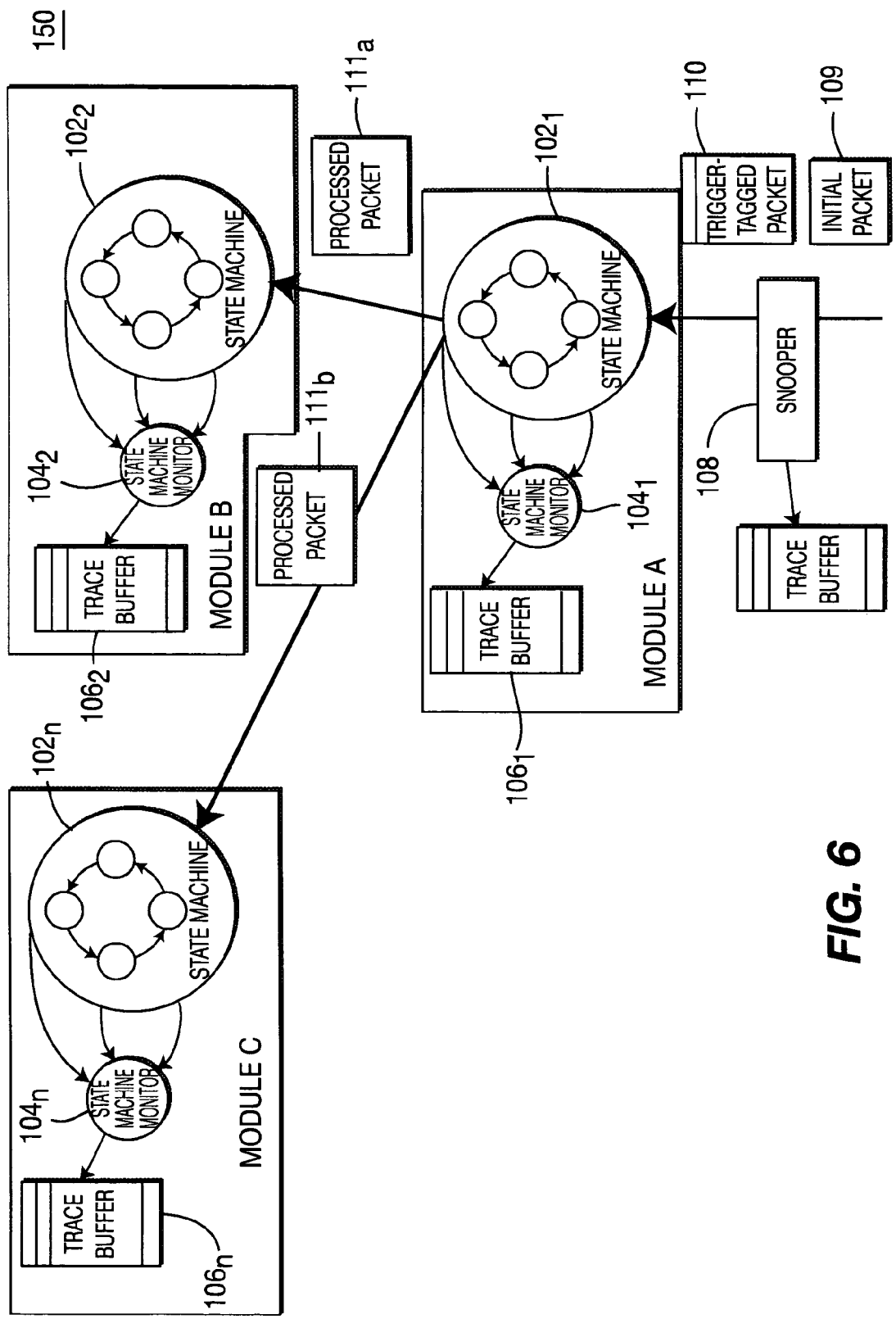
FIG. 6 is a diagram of a system with a plurality of state machines, state machine monitors, and a snooper.

FIG. 6 is a diagram of a system 150 with a plurality of state machines $102_1$-$102_n$, state machine monitors $104_1$-$104_n$, and a snooper 108. The system 150 is similar to the system 100 of FIG. 2, with the addition of a snooper 108. The snooper 108 receives an initial packet 109 and detects an occurrence of the predefined condition on the initial packet 109. If the condition is met, the snooper 108 sets a trigger tag bit. The packet 110 with the trigger tag is sent to a state machine $102_1$. The state machine monitor $104_1$ associated with the state machine $102_1$ detects the trigger tag bit through the trigger tag port 116 and stops tracing the change of the state of the state machine $102_1$.

Alternatively, the state machine monitor 104 may stop tracing the states upon satisfaction of a predetermined condition (for example, 1,000 clocks elapses, or processing of N number of packets) after the detection of the trigger tag bit. This is helpful where the packet causing a problem is not the packet having the predefined condition (i.e., not the packet having the trigger tag is attached). In this case, it is beneficial to trace further after the packet with the predefined condition is identified. The PR 142 (shown in snooper 108 in FIG. 5) is preferably programmable so that the snooper 108 may be programmed in any way that the system operator wishes.

The detection of an error within the system may also be used to stop the state machine monitors $104_1$-$104_n$ from tracing rather than using the Trigger-tag bit generated by the snooper 108. The source of the error signal could be internal or external to the system. In this case, the state machines' $102_2$-$102_n$ activities are continuously logged until the occurrence of an error. The state machine monitors' $104_1$-$104_n$ logs can then be reviewed to identify the source of the error. It is noted that this feature can be enabled during normal operation of the system.

Figure 7:
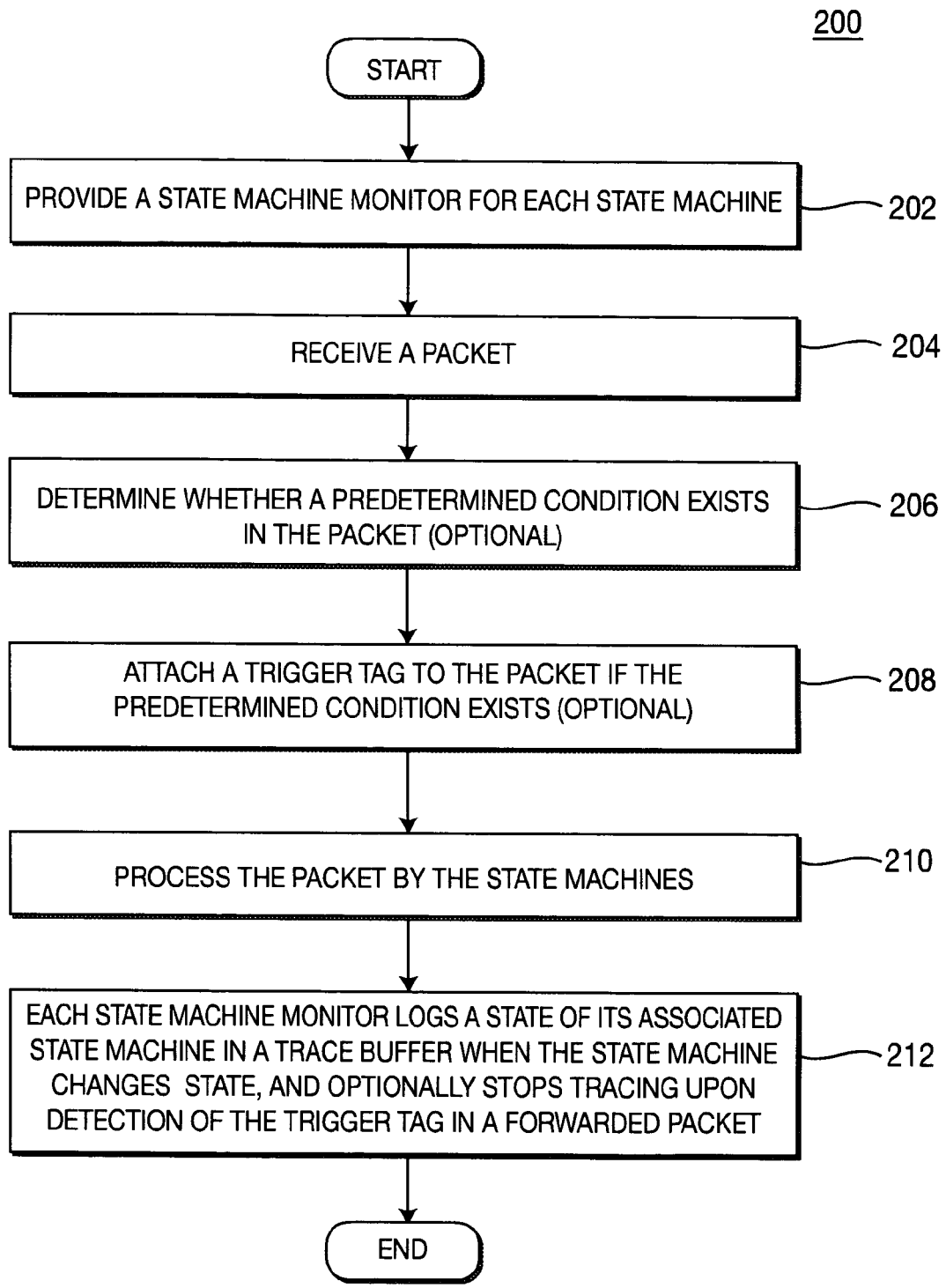
FIG. 7 is a flow diagram of a process for capturing and logging states of a state machine.

FIG. 7 is a flow diagram of a process 200 for capturing and logging states of a state machine 102 in accordance with the present invention. A state machine monitor 104 is provided for each state machine 102 (step 202). A state machine 102 receives a packet (step 204). Optionally, a snooper 108 may be provided for determining whether a predetermined condition exists in the received packet before the packet is forwarded to the state machine 102 (step 206). If the predetermined condition exists, the snooper 108 attaches a trigger tag to the received packet and forwards the tagged packet to the state machine 102 (step 208). The state machine 102 processes the received packet (step 210). The state machine monitor 104 logs a state in the associated state machine 102 in a trace buffer each time the state machine 102 changes its state, and optionally stops tracing the states upon detection of the trigger tag (step 212).

It is noted that the state machine monitor of the present invention may be configured to work with any type of state machine. For example, the number of monitoring inputs may be adjusted (e.g. increased/decreased) depending on the number of inputs to the state machine, as well as on the complexity of the state machine. It is also noted that the present invention may be implemented using any type of digital design. For example, the present invention may be implemented in a field programmable gate array (FGPA), an application specific integrated circuit (ASIC), or any type of gate array.

Although the elements in the Figures are illustrated as separate elements, these elements may be implemented on a single integrated circuit (IC), such as an application specific integrated circuit (ASIC), multiple ICs, discrete components, or a combination of discrete components and IC(s). Although the features and elements of the present invention are described in the preferred embodiments in particular combinations, each feature or element can be used alone without the other features and elements of the preferred embodiments or in various combinations with or without other features and elements of the present invention. While the present invention has been described in terms of the preferred embodiment, other variations which are within the scope of the invention as outlined in the claims below will be apparent to those skilled in the art. Furthermore, the present invention may be implemented in any type of computer system.

What is claimed is:

1. A method for capturing and logging activities of at least one state machine, comprising the steps of:

associating a state machine monitor with each state machine;

receiving a packet at the state machine;

processing the packet received by the state machine;

each state machine monitor logging activities of its associated state machine in a trace buffer when the state machine changes state, whereby changes in state of the state machine are traced to create a record in the trace buffer;

determining whether a predetermined condition exists in the received packet; and attaching a trigger tag to the received packet when the predetermined condition exists, whereby the state machine monitor stops tracing the changes in state of its associated state machine when the state machine monitor detects the trigger tag in a packet forwarded to the associated state machine.

2. The method of claim 1 wherein the state machine monitor stops tracing the activities of the associated state machine upon satisfaction of a predetermined condition after the state machine monitor detects the trigger tag.

3. The method of claim 1 wherein a sequence identity is attached to the received packet.

4. An apparatus for capturing and logging activities of at least one state machine prior to an error, comprising:

at least one first circuit configured as a state machine for processing a received packet, wherein the at least one first circuit is configured to transition among a plurality of states in accordance with an input event and to perform specific activities associated with each state while transitioning between states;

at least one second circuit configured to monitor the at least one first circuit, wherein each of the at least one second circuits is associated with one of the at least one first circuits;

at least one memory configured as at least one trace buffer, wherein each at least one trace buffer is associated with one of the at least one second circuits, and when a change in state occurs in an associated first circuit, the change is traced by an associated second circuit that creates a record of the change and stores the record in an associated trace buffer; and a snooper for determining whether a predetermined condition exists in the received packet, and for attaching a trigger tag to the received packet when the predetermined condition exists, whereby said associated second circuit stops tracing the changes of the states of the associated first circuit upon detection of the trigger tag in the packet forwarded to said state machine.

5. The apparatus of claim 4 wherein the associated second circuit stops tracing the activities of the associated first circuit upon satisfaction of a predetermined condition after the associated second circuit detects the trigger tag.

6. The apparatus of claim 4 wherein the snooper attaches a sequence identity to all received packets.

7. The apparatus of claim 4 wherein said snooper comprises:
- a programmable register for storing a predetermined condition for stopping the associated second circuit from tracing the states of the associated first circuit; and
- a comparator for determining whether the predetermined condition exists in the received packet.

* * * * *